United States Patent
Hovis et al.

(10) Patent No.: US 8,191,784 B2
(45) Date of Patent: Jun. 5, 2012

(54) HIGH DENSITY, RECTANGULAR BINARY CODE SYMBOL

(75) Inventors: Gregory Hovis, Martinez, GA (US); William Ranson, Columbia, SC (US); Reginald Vachon, Atlanta, GA (US)

(73) Assignee: Direct Measurements, Inc., Atlanta, GA (US)

( * ) Notice: Subject to any disclaimer, the term of this patent is extended or adjusted under 35 U.S.C. 154(b) by 465 days.

(21) Appl. No.: 12/311,056

(22) PCT Filed: Aug. 16, 2007

(86) PCT No.: PCT/US2007/018042
§ 371 (c)(1),
(2), (4) Date: Aug. 26, 2009

(87) PCT Pub. No.: WO2005/125020
PCT Pub. Date: Dec. 29, 2005

(65) Prior Publication Data
US 2009/0306910 A1    Dec. 10, 2009

Related U.S. Application Data

(60) Provisional application No. 60/838,151, filed on Aug. 17, 2006, provisional application No. 60/838,152, filed on Aug. 17, 2006, provisional application No. 60/838,153, filed on Aug. 17, 2006, provisional application No. 60/838,155, filed on Aug. 17, 2006, provisional application No. 60/838,201, filed on Aug. 17, 2006.

(51) Int. Cl.
*G06K 7/10* (2006.01)

(52) U.S. Cl. .............................. 235/462.09; 235/462.15
(58) Field of Classification Search ............ 235/462.01, 235/462.09, 462.15, 462.25
See application file for complete search history.

(56) References Cited

U.S. PATENT DOCUMENTS

| | | | | |
|---|---|---|---|---|
| 5,691,527 A | * | 11/1997 | Hara et al. | 235/456 |
| 5,726,435 A | * | 3/1998 | Hara et al. | 235/494 |
| 5,777,309 A | | 7/1998 | Maltsev et al. | |
| 5,811,776 A | | 9/1998 | Liu | |
| 5,862,267 A | | 1/1999 | Liu | |
| 5,949,053 A | * | 9/1999 | Zlotnick | 235/462.09 |
| 6,028,889 A | * | 2/2000 | Gude et al. | 375/150 |
| 6,186,405 B1 | * | 2/2001 | Yoshioka | 235/494 |

(Continued)

FOREIGN PATENT DOCUMENTS
WO    2005/125020 A1    12/2005

*Primary Examiner* — Daniel StCyr
(74) *Attorney, Agent, or Firm* — Jacobson Holman PLLC

(57) ABSTRACT

A binary code symbol for non-linear strain measurement designed specifically for perimeter-based deformation and strain analysis. The symbol is rectangular with a continuous outer perimeter, two data regions along adjacent sides of the rectangle and a utility region adjacent each side opposite the data regions. Each data region is made up of at least two rows, each of which is made up of a number of data cells, and each utility region is made up of at least two rows, each of which is made up of utility cells with alternating appearance. There are at least two distinct finder cells on opposite corners of the rectangle, which can be used to orient the symbol. A non-linear strain gage for measuring the strain on an object under load in accordance includes a target, a sensor, and a computer, wherein the target is a binary code symbol.

12 Claims, 2 Drawing Sheets

U.S. PATENT DOCUMENTS

| | | | |
|---|---|---|---|
| 6,267,296 B1 * | 7/2001 | Ooshima et al. | 235/487 |
| 6,802,450 B2 | 10/2004 | Cheung et al. | |
| 6,866,199 B1 | 3/2005 | Keech et al. | |
| 6,874,370 B1 | 4/2005 | Vachon | |
| 6,934,013 B2 | 8/2005 | Vachon et al. | |
| 2004/0036853 A1 | 2/2004 | Vachon et al. | |
| 2006/0173638 A1 | 8/2006 | Hovis et al. | |

* cited by examiner

HIGH DENSITY, RECTANGULAR BINARY CODE SYMBOL

CROSS-REFERENCE TO RELATED APPLICATIONS

The present patent application is a nationalization of International application No. PCT/US2007/018045, filed Aug. 16, 2007, published in English, which is based on, and claims priority from, U.S. provisional Application No. 60/838,151, 60/838,152, 60/838,153, 60/838,155, and 60/838,201, all filed Aug. 17, 2006, all of which are incorporated herein by reference in their entirety.

BACKGROUND OF THE INVENTION

1. Field of the Invention

The present invention relates to a binary code symbol for non-linear strain measurement. More specifically, the invention relates to a high density, rectangular, binary code symbol for non-linear strain measurement that constitutes an improvement over the binary code symbol that is the subject of co-pending U.S. Published Application No. 2006-0289652-A1 (application Ser. No. 11/167,558, filed Jun. 28, 2005).

2. Related Art

Co-pending U.S. Published Application No. 2006-0289652-A1, the disclosure of which is incorporated herein by reference in its entirety, is directed to a rectangular binary code symbol for non-linear strain measurement comprising a solid, continuous perimeter, first and second data regions along adjacent sides of the perimeter, first and second utility regions along adjacent sides of the perimeter opposite the first and second data regions, first and second finder cells at opposite corners of the rectangle, and inner and outer quiet regions distinguishing the first and second data regions, the first and second utility regions, and the first and second finder cells from their background. Each data region comprises a number of data cells, each data cell representing a single bit of binary data; and each utility region comprises a number of utility cells of alternating appearance.

The binary code symbol disclosed in U.S. Published Application No. 2006-0289652-A1 has a number of advantages, including that it has a unique geometry and attributes; it provides a binary code symbol for non-linear strain measurement having features that enhance deformation and strain measurement; it provides a binary code symbol for non-linear strain measurement that is designed specifically for perimeter-based deformation and strain analysis; it provides a perimeter strain analysis method for use with a binary code symbol for non-linear strain measurement; it provides a binary code symbol for non-linear strain measurement with near-perimeter data encoding; and it provides a binary code symbol for non-linear strain measurement that can encode a range of data values using an error-correcting code ("ECC") technique.

However, the amount of data that can be encoded into the binary code symbol is limited by the space available in the perimeter of the binary code symbol.

It is to the solution of this and other problems that the present invention is directed.

SUMMARY OF THE INVENTION

It is accordingly a primary object of the present invention to provide a high density, rectangular, binary code symbol that provides additional data, such as encoded data that can be termed a "license plate" (because the encoded data can be used to identify a symbol being used to measure strain, much as a license plate can be used to identify a vehicle), and/or strain readings.

It is another object of the present invention to provide a binary code symbol for non-linear strain measurement having a unique geometry and attributes.

It is still another object of the present invention to provide a binary code symbol for non-linear strain measurement having features that enhance deformation and strain measurement.

It is still another object of the present invention to provide a binary code symbol for non-linear strain measurement that is designed specifically for perimeter-based deformation and strain analysis.

It is still another object of the present invention to provide a binary code symbol for non-linear strain measurement with near-perimeter data encoding.

It is another object of the present invention to provide a binary code symbol for non-linear strain measurement that can encode a range of data values using an error-correcting code ("ECC") technique.

These and other objects of the invention are achieved by the provision of a binary code symbol of the type disclosed in U.S. Published Application No. 2006-0289652-A1, modified to increase the number of data cells. The binary code symbol has a solid, continuous outer perimeter, first and second data regions along adjacent sides of the outer perimeter, first and second utility regions along adjacent sides of the outer perimeter 20 opposite the first and second data regions, first and second finder cells at opposite corners of the rectangle, and inner and outer quiet regions distinguishing the first and second data regions, the first and second utility regions, and the first and second finder cells from their background; wherein each data region comprises at least two rows of data cells, each data cell representing a single bit of binary data; and each utility region comprises at least two rows of utility cells of alternating appearance.

The binary code symbol in accordance with the present invention doubles the number of data cells in the first and second data regions, relative to the binary code symbol of the type disclosed in U.S. Published Application No. 2006-0289652-A1, thereby increasing the number of unique encoded values from 65 thousand to over 4 billion. In addition, the number of utility cells in the first and second utility regions is also increased, permitting additional utility values to be encoded in the first and second utility regions 40.

The "finder cells" are distinct features used to "orient" the binary code symbol, in order to associate strain measurements with physical dimensions.

The binary code symbol in accordance with the present invention permits the use of the same theory and computer programs as described in U.S. Published Application No. 2006-0289652-A1.

A non-linear strain gage in accordance with the invention comprises a target associated with an object for which at least one of strain and fatigue damage is to be measured, sensor means for pre-processing a detectable physical quantity emitted by the target and output data representing the physical quantity, the sensor means being compatible with the detectable physical quantity, means for analyzing the data output by the sensor means to define the binary code symbol, and means for measuring the strain on the object directly based on the pre-processed and analyzed data, wherein the target comprises the high density binary code symbol in accordance with the present invention.

In another aspect of the invention, the non-linear strain gage further comprises means for utilizing the strain measurement to provide information on at least one of fatigue damage and strain hysteresis for materials of known and unknown mechanical properties.

In a method of measuring strain on an object directly, in accordance with the present invention, the high density binary code symbol is associated with an object in such a way that deformation of the binary code symbol and deformation under load of the object bear a one-to-one relationship, wherein the binary code symbol emits a detectable physical quantity. The changes in the binary code symbol are identified as a function of time and change in the load applied to the object. The changes in the binary code symbol are then into a direct measurement of strain.

Other objects, features, and advantages of the present invention will be apparent to those skilled in the art upon a reading of this specification including the accompanying drawings.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which.

DETAILED DESCRIPTION OF THE PREFERRED EMBODIMENTS

Figure 1:
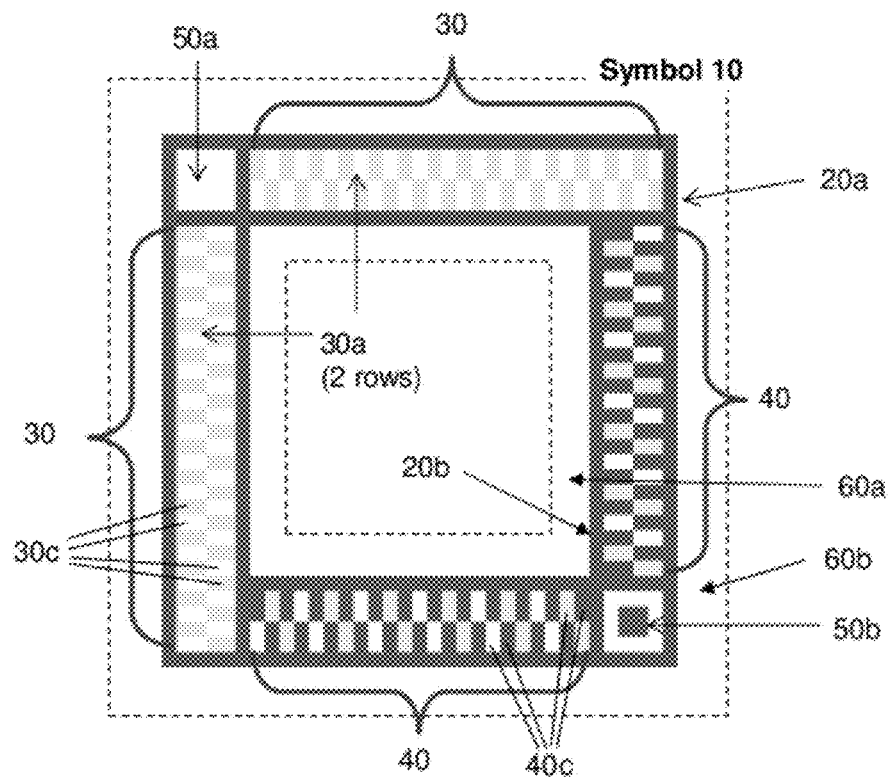
FIG. 1 illustrates a generic layout of a high density, rectangular, binary code symbol in accordance with the present invention.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

A binary code symbol for non-linear strain measurement in accordance with the present invention is designed specifically for perimeter-based deformation and strain analysis, while providing for robust, self-checking/self-correcting data encoding. Specific geometric features of the symbol are optimized for perimeter-based, non-linear strain measurement using discrete or analog deformation analysis methods.

FIG. 1 is an illustration of a generic, high density, rectangular, binary code symbol 10 in accordance with the present invention. The binary code symbol 10 is a symbol of the type disclosed in U.S. Published Application No. 2006-0289652-A1, modified to increase the number of data cells. Using the same symbol layout as disclosed in U.S. Published Application No. 2006-0289652-A1, the high density, rectangular, binary code symbol in accordance with the present invention retains its primary features: i.e., two data regions 30, two utility regions 40, and two finder cells 50a and 50b. However, the number of data cells is doubled relative to the number of data cells provided in the symbol as disclosed in U.S. Published Application No. 2006-0289652-A1 as described in greater detail below; and the number of utility cells also is increased relative to the number of utility cells provided in the symbol as disclosed in U.S. Published Application No. 2006-0289652-A1 as described in greater detail below.

In the high density, rectangular, binary code symbol 10 of FIG. 1, the rectangular symbol 10 is square in shape, with the characteristic solid, continuous outer perimeter 20a. In the binary code symbol 10 shown in FIG. 1, the symbol also has a solid, continuous inner perimeter 20b, although in general, a solid, continuous inner perimeter is not required.

There are two data regions 30 along adjacent sides of the rectangle. Each data region 30 is made up of at least two rows 30a and 3b, and each row is made up of a number of data cells 30c. The symbol 10 in FIG. 2 has twenty-eight data cells 30c per row and fifty-six data cells 30c per data region 30; however no particular limit is placed on the number of data cells per row. In the case of symbols that are symmetric about a diagonal of the rectangle, the data regions 30 can be identical to one another for encoded-data redundancy.

Opposite each data region 30 along a side of the rectangle is a utility region 40. The utility regions 40 are made up of at least two rows 40a and 40b, each row being made up of utility cells 40c with alternating appearance (i.e. foreground, background, foreground, etc.). The utility regions 40 assist in symbol location, orientation, and analysis. In addition, the inner half of the utility regions can be used to store auxiliary information and/or codes (e.g. license plate number, vendor ID, application ID, function ID, version information, date/time, materials ID/info, etc.).

There are at least two distinct finder cells 50a and 50b in respective corners of the rectangle which can be used to orient the symbol. The finder cells 50a and 50b can be in any of the corners of the rectangle; they do not have to be in opposite corners. Inner and outer quiet regions 60a and 60b are designated whereby the data regions 30, the utility regions 40, and the finder cells 50a and 50b and can be distinguished from their background. It is noted that in FIG. 1, broken lines are used to show the boundaries of the inner and outer quiet regions 60a and 60b, but that in practice, the symbol does not actually include these broken lines.

The division of the first and second data regions 30 into, for example, two rows 30a and 30b, each of which is made up of data cells 30c, doubles the number of data cells 30c in the first and second data regions 30 of the binary code symbol 10 in accordance with the present invention, relative to the binary code symbol as disclosed in U.S. Published Application No. 2006-0289652-A1, thereby increasing the number of unique encoded values from 65 thousand to over 4 billion. In addition, the division of the first and second utility regions 40 into, for example, two rows 40a and 40b, each of which is made up of utility cells 40c, doubles the number of utility cells 40c in the first and second utility regions 40, permitting additional utility values to be encoded in the first and second utility regions 40.

In a binary code symbol 10 in accordance with the present invention, information is encoded via the symbol's data cells 30c as described in U.S. Published Application No. 2006-0289652-A1. An individual data cell 30c represents a single bit of information; that is, its state is either "on" or "off" (i.e. "1" or "0"). The order and state of individual bit values combine to represent an encoded data value. The binary contribution of a single data cell 30c is indicated by the cell's state, which is determined by a sensor. Data cells 30c that have the same appearance as the symbol's background (or quiet region) are considered "on" or bit value "1." Data cells 30c that have the same appearance as the foreground (or perimeter) are considered "off" or bit value "0." There are no restrictions placed on cell foreground and background appearance except that sufficient contrast is provided to enable a sensor to determine cell state.

As described in U.S. Published Application No. 2006-0289652-A1, a binary encoding technique with error correction is used to encode information in the data regions. Using this method, 28 cells can store 16 bits of information, and 56 cells can store 32 bits of information. By doubling the number of data cells, the data capacity increases significantly. The following table compares the data-encoding capacity for a 28-data-cell as described in U.S. Published Application No. 2006-0289652-A1 and a 56-data-cell high density, rectangular binary code symbol 10 in accordance with the present invention:

| # data cells per data region | # bits encoded with error correction | # unique code combinations |
|---|---|---|
| 28 | 16 | $2^{16} = 65,536$ |
| 56 | 32 | $2^{32} = 4,294,967,296$ |

Figure 2:
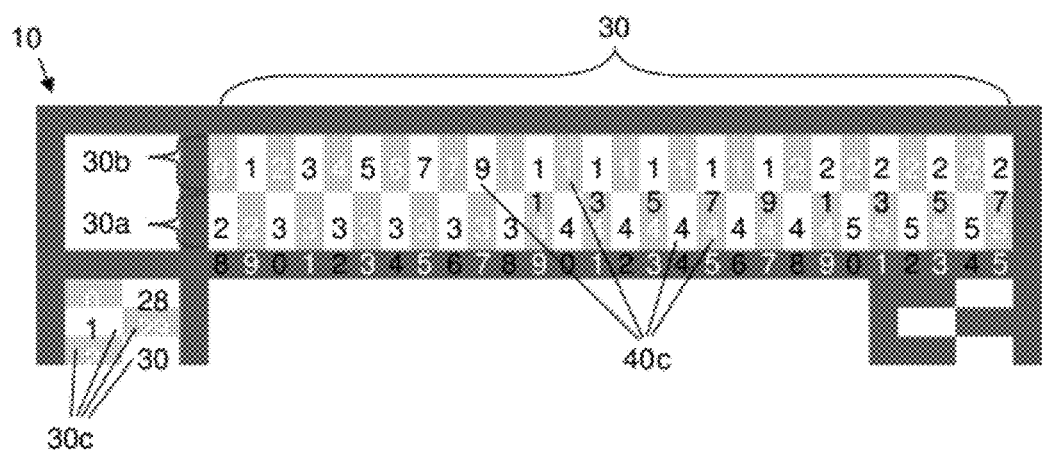
FIG. 2 is an enlarged view of the first data region of the high density, rectangular, binary code symbol of FIG. 1.
Figure 3:
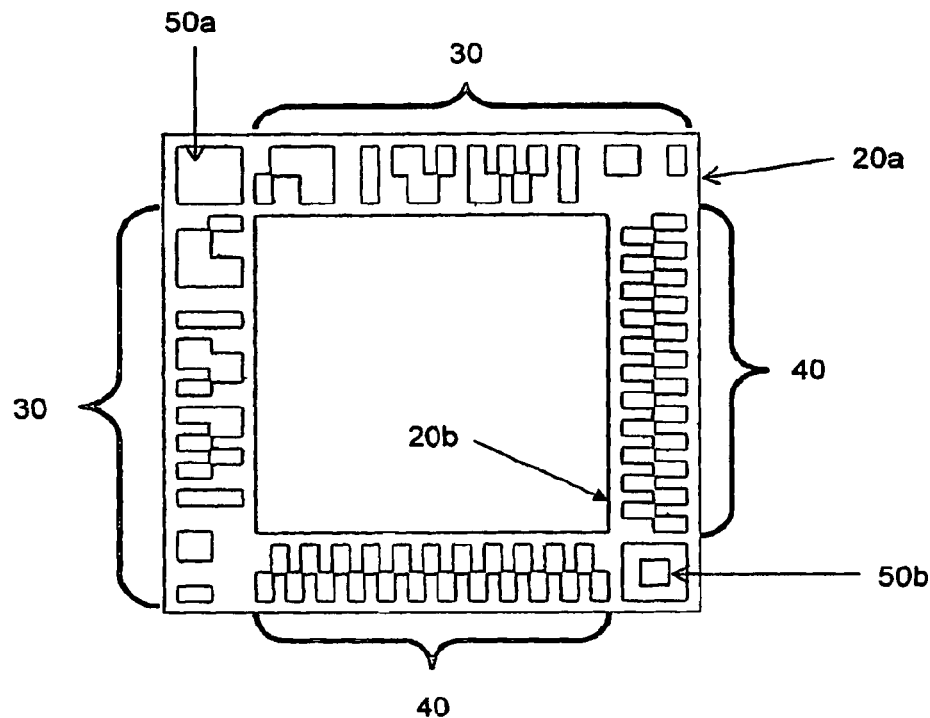
FIG. 3 illustrates an exemplary, high density, rectangular, binary code symbol in accordance with the present invention with the number 136,485,715 encoded.
Figure 4:
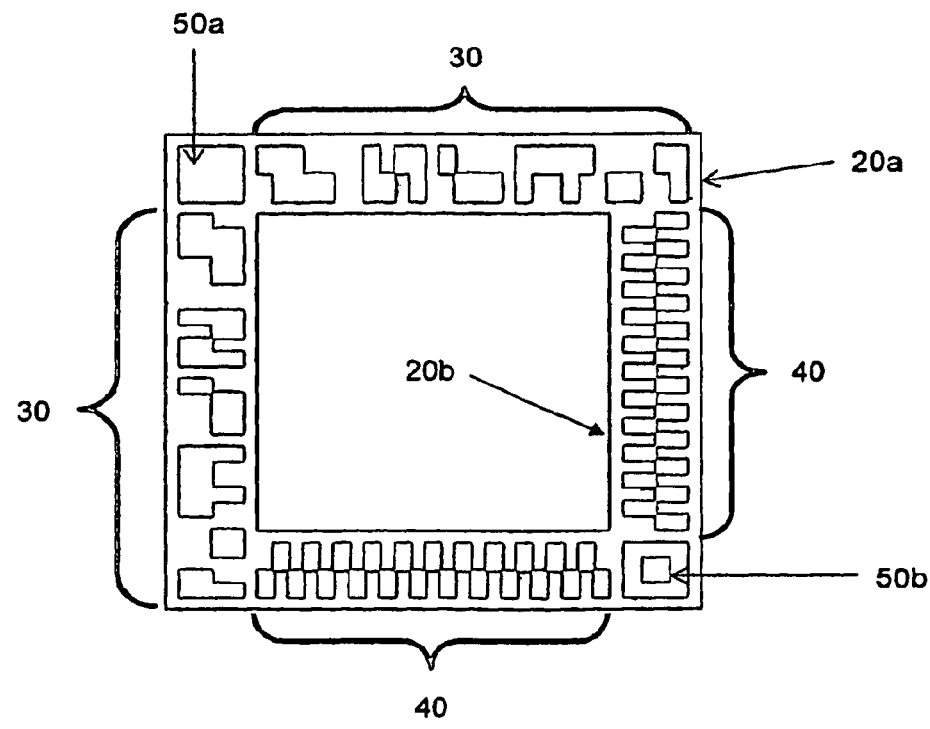
FIG. 4 illustrates an exemplary, high density, rectangular, binary code symbol in accordance with the present invention with the number 2,558,774,865 encoded.

The arrangement of the data region 30 made up of two rows 30a and 30b is shown in FIG. 2. With 28 data cells in each row, each data region 30 stores a 16-bit "low-order word" in the "outer" row 30b, and a 16-bit "high-order word" in the "inner" row 30a. When combined, the two 16-bit values produce a 32-bit value.

As shown in FIG. 2, the outer row 30b contains the twenty-eight data cells 30c numbered 0-27, and the inner row 30a contains the twenty-eight data cells 30c numbered 29-55, for a total of fifty-six data cells 30c. While FIG. 2 only shows the "top" data region 30 (the first data region), the mirror image pattern and numbering convention is used in the "left" data region 30 (the second data region) for redundancy.

Since the overall symbol geometry has not changed from that disclosed in U.S. Published Application No. 2006-0289652-A1, and the data cells 30c remain in a contiguous layout across the data regions 30, the theory, algorithms, and computer programs used to scan and decode the symbol 10 and to measure strain, as disclosed in U.S. Published Application No. 2006-0289652-A1, remain essentially the same. One subtle difference is that the decoding algorithm is simply applied over multiple data-region rows rather than one.

Finally, by staggering the cells 40c in the utility regions 40, greater amounts of utility data can be stored (again, using, the same algorithms and software, but applied over two rows rather than one).

As disclosed in U.S. provisional application No. 60/838,153, refinement of the marking process can also be used to increase the density of the data. More specifically, the cells must have well defined (not fuzzy) edges, and as the imaging lens magnifies the image and the edges, the selection of the marking process affects the quality of the edges. If a short wave length laser is used for marking, as compared to a long wave laser, the definition and quality for the edge can be refined and smaller cells can be produced.

The high density, rectangular, binary code symbol 10 in accordance with the present invention can be used as the target of a non-linear strain gage for measuring the strain on an object under load, as described in U.S. Published Application No. 2006-0289652-A1. Deformation analysis of the symbol's spatial characteristics and strain measurement can be carried out as disclosed in U.S. Published Application No. 2006-0289652-A1, using the methods, algorithms, and apparatus as disclosed therein.

A non-linear strain gage employing the high density, rectangular, binary code symbol 10 as a target also uses the same theory, algorithms, and computer programs as described in the U.S. Published Application No. 2006-0289652-A1, which (1) identify the binary code symbols and the changes therein as a function of time and change in the load, (2) translate the changes in the binary code symbols into strain, and (3) display it in a suitable format.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

What is claimed is:

1. A non-linear strain gage comprising:
    a target associated with an object for which at least one of strain and fatigue damage is to be measured and emitting a detectable physical quantity, the target comprising a rectangular binary code symbol including:
        a solid, continuous outer perimeter;
        first and second data regions along adjacent sides of the perimeter, each data region comprising at least two rows, each row comprising a plurality of data cells, each data cell representing a single bit of binary data;
        first and second utility regions along adjacent sides of the perimeter opposite the first and second data regions, each utility region comprising at least two rows, each row comprising a plurality of utility cells of alternating appearance;
        first and second finder cells at opposite corners of the rectangle; and
        inner and outer quiet regions distinguishing the first and second data regions, the first and second utility regions, and the first and second finder cells from their background;
    sensor means for pre-processing the detectable physical quantity emitted by the target and output data representing the physical quantity, the sensor means being compatible with the detectable physical quantity;
    means for analyzing the data output by the sensor means to define the binary code symbol; and
    means for measuring the strain on the object directly based on the pre-processed and analyzed data.

2. The non-linear strain gage of claim 1, further comprising means for utilizing the strain measurement to provide information on at least one of fatigue damage and strain hysteresis for materials of known and unknown mechanical properties.

3. The non-linear strain gage of claim 1, further comprising means for utilizing the strain measurement to assist in component lifecycle management.

4. The non-linear strain gage of claim 1, further comprising means for utilizing the strain measurement based on collected damage accumulation data.

5. The non-linear strain gage of claim 1, wherein the binary code symbol is defined a priori by manufacture.

6. The non-linear strain gage of claim 1, wherein the target is identified in a pre-existing pattern that defines the binary code symbol.

7. A method of measuring strain on an object directly, using a binary code symbol for non-linear strain measurement that includes:

a solid, continuous outer perimeter;

first and second data regions along adjacent sides of the perimeter, each data region comprising at least two rows, each row comprising a plurality of data cells, each data cell representing a single bit of binary data;

first and second utility regions along adjacent sides of the perimeter opposite the first and second data regions, each utility region comprising at least two rows, each row comprising a plurality of utility cells of alternating appearance;

first and second finder cells at opposite corners of the rectangle; and inner and outer quiet regions distinguishing the first and second data regions, the first and second utility regions, and the first and second finder cells from their background, the method comprising the steps of:

associating the binary code symbol with an object in such a way that deformation of the binary code symbol and deformation under load of the object bear a one-to-one relationship, wherein the binary code symbol emits a detectable physical quantity;

identifying the changes in the binary code symbol as a function of time and change in the load applied to the object; and translating the changes in the binary code symbol into a direct measurement of strain.

8. The method of claim 7, wherein the binary code symbol is defined a priori by manufacture and the associating step comprises applying the binary code symbol to the object.

9. The method of claim 7, wherein the associating step comprises identifying the binary code symbol a priori.

10. The method of claim 7, further comprising the step of utilizing the strain measurement to provide information on at least one of fatigue damage and strain hysteresis for materials of known and unknown mechanical properties.

11. The method of claim 7, further comprising the step of utilizing the strain measurement to assist in component life-cycle management.

12. The method of claim 7, further comprising the step of utilizing the strain measurement based on collected damage accumulation data.

* * * * *